Dec. 20, 1938.　　　　G. F. NADEAU　　　　2,140,648
PHOTOGRAPHIC STRIPPING FILM
Original Filed May 16, 1936
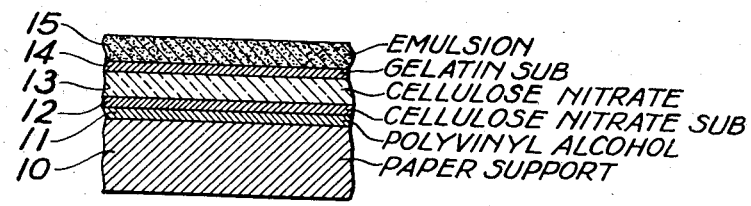
Gale F. Nadeau
INVENTOR
BY
ATTORNEYS Patented Dec. 20, 1938

2,140,648

UNITED STATES PATENT OFFICE 2,140,648

PHOTOGRAPHIC STRIPPING FILM

Gale F. Nadeau, Rochester, N. Y., assignor, by mesne assignments, to Eastman Kodak Company, Jersey City, N. J., a corporation of New Jersey Original application May 16, 1936, Serial No. 80,127. Divided and this application February 3, 1938, Serial No. 188,543

4 Claims. (Cl. 95—9)

This invention relates to photographic stripping film, that is, film in which the sensitive layer is carried on a temporary support from which it may be removed, together with a permanent support layer, after exposure.

This application is a division of application Serial No. 80,127, filed May 16, 1936.

A photographic stripping film of this type is described, for example, in U. S. Patent No. 1,973,476 of Fordyce et al. These films are used in the photo-engraving and related arts where an image is to be recorded and after development and fixing, removed from the temporary support and affixed to a transparent plate for the purpose of making photo-engraving plates. The emulsions used are usually a type which give an image having a high degree of contrast. A frequent difficulty encountered in this type of film is the presence of areas of varying sensitivity, produced by the lack of uniformity of overlying layers or by other factors, not fully understood. This results in the formation of undesirable lines and mottle on the negative. A method of overcoming these undesirable factors was described in my prior application, Serial No. 64,103, filed February 15, 1936, in which I described an adhesive layer having a controlled hydrogen ion concentration so that the emulsion layer would not be adversely affected.

The principal object of the present invention is to provide an improved method for overcoming these difficulties and for producing a stripping film in which the sensitive emulsion does not show areas of varying sensitivity.

This object is accomplished according to the present invention by applying a layer of a substantially water-soluble synthetic resin over the temporary paper support and coating the permanent support, with or without intervening layers, on the water-soluble synthetic resin layer. Experimentation has established the fact that much of the difficulty referred to above may be attributed to the unevenness and lack of uniformity of the adhesive layer of the film. When the adhesive layer is displaced by a water-soluble synthetic resin layer or is coated as a very thin layer over a water-soluble synthetic resin layer applied to the paper stock, the difficulties caused by the differential imbibition of the adhesive by the paper stock, are avoided. The synthetic resin does not have the same tendency to soak into the paper support that the usual adhesive layer does and unevenness of coating is thereby avoided.

In the accompanying drawing which forms a part of the present invention I have shown in a single view an enlarged section of a stripping film made according to my invention.

The construction of the stripping film made according to my invention will now be described by reference to the accompanying drawing. As shown in the drawing, a support 10 of paper or other suitable material which is used as a temporary support for the film during exposure, is coated with a layer 11 of polyvinyl alcohol in a 3 to 10% solution in water. The concentration of this solution will be determined by the method of application and by the speed of coating. A thin layer 12 of cellulose nitrate is applied over the polyvinyl alcohol layer and this is followed by a heavier layer 13 of cellulose nitrate, cellulose acetate, or other suitable cellulose ester which constitutes the permanent support. The permanent support is coated with the conventional subbing layer 14 and emulsion layer 15.

In the modification of my invention in which a water-soluble synthetic resin is used as the adhesive layer, it is sometimes desirable to coat a thin layer of a water-soluble glue directly over the resin layer. This is coated as a very thin layer, much thinner than where the glue is used as the only adhesive, and may be, for example, a 2% solution of glue containing 1% of glycerine in water. The advantage of a stripping film in which the glue layer is partially or completely eliminated is that the stripping time is considerably reduced since the water of the processing bath does not need to penetrate a heavy glue layer.

In place of the polyvinyl alcohol any other suitable water-soluble synthetic resin, which is sufficiently permeable to water or soluble in water to permit ready stripping of the permanent support from the temporary support, may be used.

Film made according to my invention has a number of important advantages which make it superior to the usual stripping film. It is free from emulsion difficulties, such as lines and mottle, and also may be stripped from the temporary support more easily and quickly than films hitherto used. Little or no glue adhesive is necessary and there is a consequent decrease in the stripping time since less water must diffuse through the layers to dissolve the reduced quantity of adhesive.

Although I have described a certain sequence of the layers in the stripping film made according to my invention, it is to be understood that not all of these layers are absolutely essential and that other layers may be added, if desired. The essential feature of my invention is the use of a water-soluble synthetic resin layer coated between the temporary support and the permanent support or between the temporary support glue adhesive, if such adhesive is used. The remaining layers are added in a manner well known to those skilled in the photographic film-making art. It is known, for example, that a gelatin layer does not readily adhere to cellulose layers of every composition, although the gelatin layer will adhere to a cellulose nitrate layer. In some cases it is necessary to use an additional layer between the cellulose acetate layer, if this is used as the permanent support, and the gelatin layer, in order to secure satisfactory adhesion. The paper support may also carry other layers, such as a baryta or dextrin coating or both. The paper support may also be backed with cellulose nitrate or acetate layers for gelatin as described in my application, Serial No. 80,127. My invention is to be taken only as limited only by the scope of the appended claims.

What I claim is:

1. A photographic stripping film comprising in order, a paper support, a water-soluble synthetic resin layer, a cellulose nitrate layer, a cellulose ester permanent support, and a photographic emulsion layer, the layers adhering firmly in the dry state.

2. A photographic stripping film comprising in order, a paper support, a polyvinyl alcohol layer, a cellulose nitrate layer, a cellulose ester permanent support, and a photographic emulsion layer, the layers adhering firmly in the dry state.

3. A photographic stripping film comprising a paper temporary support, a water-permeable cellulose ester permanent support carrying a light-sensitive emulsion layer, and between said temporary support, and said cellulose ester permanent support a layer of a water-soluble synthetic resin, the said layers adhering firmly in the dry state.

4. A photographic stripping film comprising a paper temporary support, a water-permeable cellulose ester permanent support carrying a light-sensitive emulsion layer, and between said temporary support and said cellulose ester permanent support a layer of a water-soluble polyvinyl alcohol, the said layers adhering firmly in the dry state.

GALE F. NADEAU.